US010529996B2

(12) United States Patent
Sakano et al.

(10) Patent No.: US 10,529,996 B2
(45) Date of Patent: Jan. 7, 2020

(54) HEADER DESIGN EMPLOYING GENERALLY REGULAR SHAPES (71) Applicants: GM GLOBAL TECHNOLOGY OPERATIONS LLC, Detroit, MI (US); Honda Motor Co., Ltd., Tokyo (JP)

(72) Inventors: Masaaki Sakano, Tokyo (JP); Xi Yang, Bloomfield Hills, MI (US); Liang Xi, Madison Heights, MI (US); Siguang Xu, Rochester Hills, MI (US); Joseph N. Lovria, Davisburg, MI (US); Jeffrey D. Williams, Tonawanda, NY (US); Yu Tomana, Tokyo (JP); Kentaro Ishida, Tokyo (JP)

(73) Assignees: GM Global Technology Operations LLC, Detroit, MI (US); Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 15/436,207

(22) Filed: Feb. 17, 2017

(65) Prior Publication Data
US 2018/0241055 A1    Aug. 23, 2018

(51) Int. Cl.
*H01M 8/0276* (2016.01)
*H01M 8/0258* (2016.01)

(52) U.S. Cl.
CPC ........ *H01M 8/0276* (2013.01); *H01M 8/0258* (2013.01)

(58) Field of Classification Search
CPC .......................... H01M 8/0258; H01M 8/0276
USPC ........................................................ 429/511
See application file for complete search history.

(56) References Cited

U.S. PATENT DOCUMENTS

| 5,700,016 A | 12/1997 | Miyaoh et al. |
| 2005/0249996 A1* | 11/2005 | Meacham ........... H01M 8/0247 429/432 |
| 2007/0184328 A1 | 8/2007 | Frederiksen et al. |

(Continued)

FOREIGN PATENT DOCUMENTS

JP    2016048620 A    4/2016

OTHER PUBLICATIONS

Office Action dated Oct. 1, 2019 received from the Japanese Patent Office for Japanese Patent Application No. 2018026982.

*Primary Examiner* — Jonathan G Jelsma
*Assistant Examiner* — Omar M Kekia
(74) *Attorney, Agent, or Firm* — Quinn IP Law (57) ABSTRACT A plate includes a working face and a header portion. The working face defines a plurality of reactant channels thereon. The header portion is disposed in a peripheral area of the plate and includes a plurality of flanges and a plurality of beads. The flanges are disposed on the header portion and define a plurality of apertures through the plate. Each flange defines a respective one of the apertures. At least one of the apertures is fluidly connected to the reactant channels. The plurality of beads is disposed on the working face. Each bead is disposed about a respective one of the apertures and thereby defines a respective one of the flanges. Each bead defines a shape consisting of bead-corners and bead-sides. Each bead has a sealing surface thereon. The sealing surface is configured to deflect when exposed to a contact pressure to thereby provide a substantially fluid-tight seal.

12 Claims, 6 Drawing Sheets

(56) References Cited

U.S. PATENT DOCUMENTS

2009/0197147 A1* 8/2009 Fly .................. H01M 8/0276
429/509

* cited by examiner

HEADER DESIGN EMPLOYING GENERALLY REGULAR SHAPES

CROSS-REFERENCE TO RELATED APPLICATION

This application is related to co-pending U.S. patent application Ser. No. 15/436,205 filed Feb. 17, 2017, titled "Design of Header Flange to Evenly Distribute Contact Pressure Across Seals," which is herein incorporated by reference in its entirety.

INTRODUCTION

The disclosure relates to the field of fuel cells and, more specifically, to header portions employing regular shapes.

Fuel-cell systems can be used as a power source in a wide variety of applications to provide electrical energy. The generated electrical energy may be immediately used to power a device such as an electric motor. Additionally or alternatively, the generated electrical energy may be stored for later use by employing, for example, batteries.

In some applications, fuel cells are incorporated into stationary structures to provide electric power to buildings, residences, and the like. In some applications, fuel cells are incorporated into devices such as smart phones, video cameras, computers, and the like. In some applications, fuel cells are incorporated into vehicles to provide or supplement motive power.

Fuel-cell systems generally include fuel cells arranged in a fuel-cell stack. The fuel-cell stack, which can contain more than one-hundred plates, is compressed to apply a contact pressure to seals between adjacent components of the fuel-cell stack to prevent leakage of fluids flowing therethrough. For example, coolant mixing the reactants or the reactants mixing away from the active areas of the fuel cells reduces effectiveness of the fuel-cell stack. Because of the number of components, even minor differences in contact pressure distribution along the seals become amplified across the stack, which can prevent formation of fluid-tight seals.

Accordingly, it would be beneficial to evenly distribute contact pressure across seals of the fuel-cell stack.

SUMMARY

According to aspects of the present disclosure, a plate includes a working face and a header portion. The working face defines a plurality of reactant channels thereon. The header portion is disposed in a peripheral area of the plate and includes a plurality of flanges and a plurality of beads. The plurality of flanges is disposed on the header portion. The plurality of flanges defines a plurality of apertures through the plate. Each of the plurality of flanges defines a respective one of the plurality of apertures. At least one of the plurality of apertures is fluidly connected to the plurality of reactant channels. The plurality of beads is disposed on the working face. Each of the plurality of beads is disposed about a respective one of the plurality of apertures and thereby defines a respective one of the plurality of flanges. Each of the plurality of beads defines a shape consists of bead-corners and bead-sides. Each of the plurality of beads has a sealing surface thereon. The sealing surface is configured to deflect when exposed to a contact pressure to thereby provide a substantially fluid-tight seal.

According to further aspects of the present disclosure, the shape is generally hexagonal.

According to further aspects of the present disclosure, each bead-corner defines an angle, and each respective angle that measures between about 50° and about 70°.

According to further aspects of the present disclosure, each bead-corner defines an angle that measures about 60°.

According to further aspects of the present disclosure, each bead-corner defines a respective angle, and each respective angle is within about 10° of every other respective angle.

According to further aspects of the present disclosure, the bead-corners are configured to produce a contact pressure variance of less than about 50% along the sealing surface.

According to further aspects of the present disclosure, the bead-corners are configured to produce a contact pressure variance of less than about 30% along the sealing surface.

According to further aspects of the present disclosure, each of the bead-corners is generally radiused.

According to further aspects of the present disclosure, each of the bead-sides follows a serpentine path.

According to aspects of the present disclosure, a system includes a plate, a component, and a compressive member. The plate includes a working face and a header portion. The working face defines a plurality of reactant channels thereon. The header portion is disposed in a peripheral area of the plate. The header portion includes a plurality of flanges and a plurality of beads. The plurality of flanges is disposed on the working face. The plurality of flanges defines a plurality of first apertures through the plate. Each of the plurality of flanges defines a respective one of the plurality of first apertures. At least one of the plurality of first apertures is fluidly connected to the plurality of reactant channels. The plurality of beads is disposed on the working face. Each of the plurality of beads is disposed about a respective one of the plurality of first apertures to thereby define a respective one of the plurality of flanges. Each of the plurality of beads defines a shape. The shape consists of bead-corners and bead-sides. Each of the plurality of beads has a sealing surface thereon. The sealing surface is configured to deflect when exposed to a contact pressure to thereby provide a substantially fluid-tight seal. The component abuts the plate. The component includes a plurality of second apertures therethrough. Each of the plurality of second apertures is aligned with a respective one of the plurality of first apertures. The compressive member is configured to exert a compressive force on the plate to thereby produce the contact pressure.

According to further aspects of the present disclosure, the component further includes a second working face. The second working face has a plurality of second beads disposed thereon. Each of the plurality of second beads is disposed about a respective one of the plurality of second apertures. Each of the plurality of second beads defines the shape.

According to further aspects of the present disclosure, the second working face is disposed proximate the working face, each of the plurality of second beads includes a second sealing surface thereon, and the component abuts the plate when the second sealing surface contacts the sealing surface to produce the contact pressure therebetween.

According to further aspects of the present disclosure, the plate further includes a first rear face opposite the working face and the component further includes a second rear face. The second rear face is attached to the first rear face. The first rear face and the second rear face define a plurality of coolant channels between the plate and the component. The plurality of coolant channels is fluidly connected to at least another of the plurality of first apertures.

According to further aspects of the present disclosure, each bead-corner defines an angle, and each angle measures between about 50° and about 70°.

According to further aspects of the present disclosure, the bead-corners are configured to produce a contact pressure variance of less than about 30% along the sealing surface.

According to further aspects of the present disclosure, the component is a unified electrode assembly.

According to aspects of the present disclosure, a fuel-cell stack includes a first plate, a second plate, a unified electrode assembly, and a compressive member. The first plate includes a first working face and a first header portion. The first working face defines a plurality of first reactant channels thereon. The first header portion is disposed in a peripheral area of the first plate. The first header portion includes a plurality of first flanges and a plurality of first beads. The plurality of first flanges is disposed on the header portion. The plurality of first flanges defines a plurality of first apertures through the first plate. Each of the plurality of first flanges defines a respective one of the plurality of first apertures. At least one of the plurality of first apertures is fluidly connected to the plurality of first reactant channels. The plurality of first beads is disposed on the first working face. Each of the plurality of first beads is disposed about a respective one of the plurality of first apertures to thereby define a respective one of the plurality of first flanges. Each of the plurality of first beads defines a shape. The shape consists of bead-corners and bead-sides. Each of the plurality of first beads has a first sealing surface thereon. The first sealing surface is configured to deflect when exposed to a contact pressure to thereby provide a substantially fluid-tight seal. The second plate includes a second working face and a second header portion. The second working face defines a plurality of second reactant channels thereon. The second header portion is disposed in a peripheral area of the second plate. The second header portion includes a plurality of second flanges and a plurality of second beads. The plurality of second flanges is disposed on the second header portion. The plurality of second flanges defines a plurality of second apertures through the second plate. Each of the plurality of second flanges defines a respective one of the plurality of second apertures. At least one of the plurality of second apertures is fluidly connected to the plurality of second reactant channels. The plurality of second beads is disposed on the second working face. Each of the plurality of second beads is disposed about a respective one of the plurality of second apertures to thereby define a respective one of the plurality of second flanges. Each of the plurality of second beads defines the shape. The shape consists of bead-corners and bead-sides. Each of the plurality of second beads has a second sealing surface thereon. The second sealing surface is configured to deflect when exposed to the contact pressure to thereby provide a substantially fluid-tight seal. The unified electrode assembly is disposed between the first plate and the second plate. The unified electrode assembly includes a first side that contacts the plurality of first reactant channels and a second side that contacts the plurality of second reactant channels. The compressive member is configured to exert a compressive force on the first plate, the second plate, and the unified electrode assembly. The compressive force is configured to apply the contact pressure to the plurality of first beads and the plurality of second beads.

According to further aspects of the present disclosure, each bead-corner defines an angle, each angle measuring between about 50° and about 70°.

According to further aspects of the present disclosure, each bead-corner defines an angle that measures about 60°.

According to further aspects of the present disclosure, the shape is a hexagon.

The above features and advantages and other features and advantages of the present disclosure are readily apparent from the following detailed description when taken in connection with the accompanying drawings.

BRIEF DESCRIPTION OF THE DRAWINGS

The accompanying drawings are illustrative and not intended to limit the subject matter defined by the claims. Exemplary aspects are discussed in the following detailed description and shown in the accompanying drawings in which:

DETAILED DESCRIPTION

Figure 1:
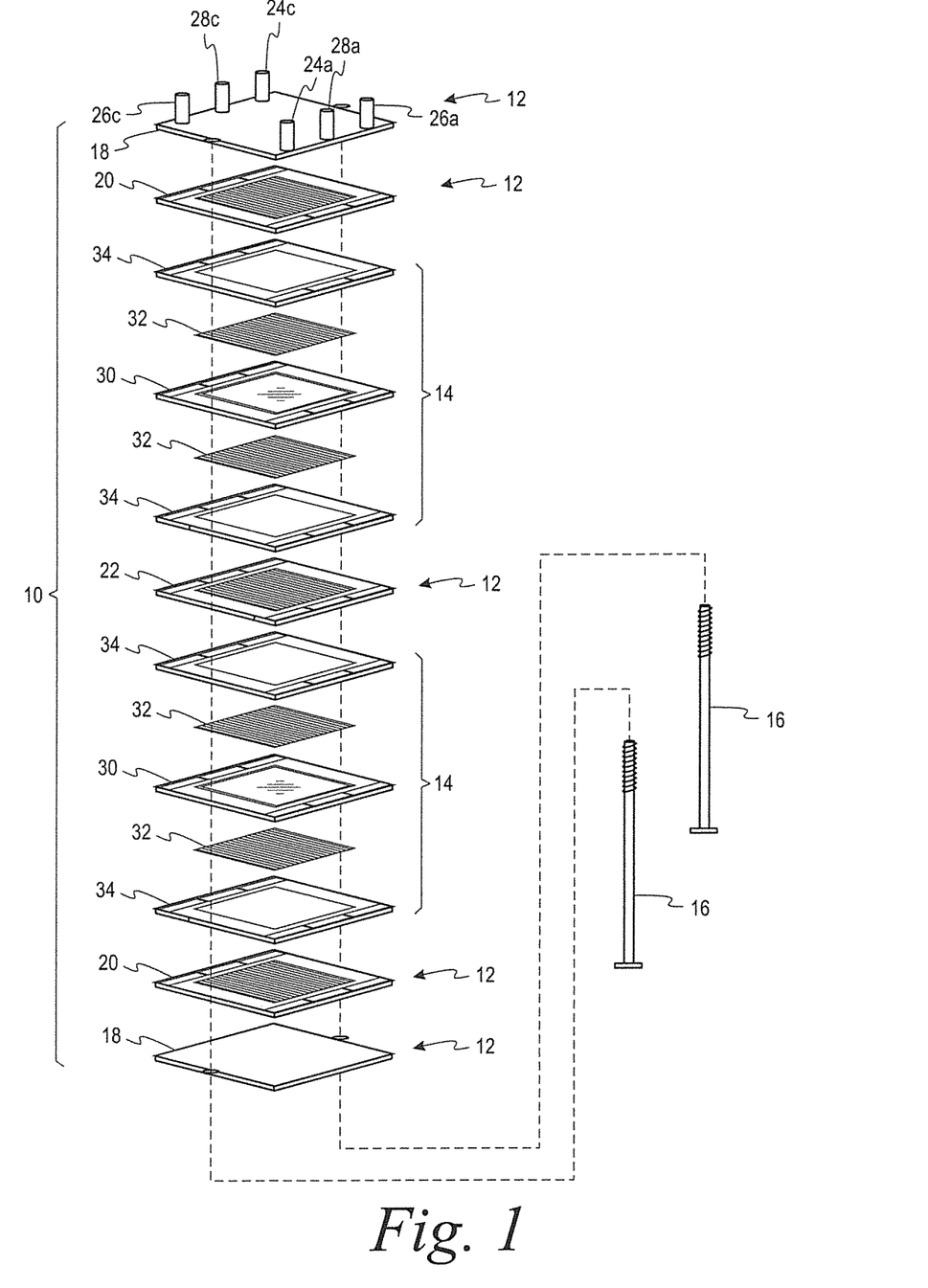
FIG. 1 is a schematic exploded view of a fuel-cell stack according to aspects of the present disclosure.

FIG. 1 is an exploded view of a fuel-cell stack 10. The fuel-cell stack 10 includes a plurality of plates 12, at least one unified electrode assembly 14, and a compressive member 16. The plurality of plates 12 may include any suitable combination of plates 12. For example, the plurality of plates 12 may include endplates 18, monopolar plates 20 (shown in greater detail in FIG. 2), and/or bipolar plates 22 (shown in greater detail in FIG. 4). According to aspects of the present disclosure, any or all seals between the plurality of plates 12, the at least one unified electrode assembly 14, and the compressive member 16 can be configured to evenly distribute contact pressure across the seals by employing regular header shapes as described herein.

The endplates 18 are disposed at the top and bottom of the fuel-cell stack 10. The endplates 18 include fuel inlets 24a, fuel outlets 24c, oxidant inlets 26a, oxidant outlets 26c, coolant inlets 28a, and coolant outlets 28c disposed thereon. As used herein, "fluids" can refer to fuels, oxidants, coolants, or any combination thereof as the context dictates and "reactants" can refer to fuels, oxidants, or both as the context dictates. For example, "fluid inlets 24a, 26a, 28a" can refer to any or all of fuel inlets 24a, oxidant inlets 26a, or coolant inlets 28a as the context dictates and "reactant channels 24b, 26b" can refer to either or both of fuel channels 24b and oxidant channels 26b as context dictates. It is contemplated that certain of the fluid inlets 24a, 26a, 28a and fluid outlets 24c, 26c, 28c can be located on one endplate 18 with the remaining fluid inlets 24a, 26a, 28a and fluid outlets 24c, 26c, 28c being located on the opposite endplate 18.

The unified electrode assembly 14 includes a fuel cell 30 disposed between diffusion media 32. The fuel cell 30 may be, for example, a membrane electrode assembly that includes a membrane disposed between a cathode and an anode. The membrane may be, for example, a proton-exchange membrane. The cathode and anode may include, for example, a finely divided catalyst supported on carbon particles and mixed with an ionomer. In some aspects, the catalyst is platinum.

The diffusion media 32 are porous layers that facilitate delivery of reactants to the fuel cell 30. The reactants can include any suitable fuel and oxidant combination. For example, the fuel may be hydrogen and the oxidant may be oxygen. In a hydrogen fuel cell 30, hydrogen and oxygen react to produce electricity with heat and water as by-products. Other fuels can be used such as natural gas, methanol, gasoline, and coal-derived synthetic fuels, for example. In some aspects, the diffusion medium 32 is attached to a surface of the fuel cell 30 using lamination, adhesion, or any other suitable method. In some aspects, the diffusion medium 32 abuts the surface of the fuel cell, but is not adhered thereto. For example, the diffusion medium 32 may be placed against the surface of the fuel cell 30 and held in place by a retaining member 34. The retaining member 34 can be, for example, a gasket.

The compressive member 16 applies a compressive force to the fuel-cell stack 10 along the stacking direction. The compressive force secures the plates 12 and fuel cells 30 in position through a contact pressure between adjacent components. In some aspects, the compressive member 16 includes a plurality of threaded rods that engage structures on the endplates 18. By tightening the threaded rods, a compressive force is increased to a desired level along the stacking direction which results in a contact pressure being distributed along seals between adjacent components. In some aspects, the compressive members 16 engage less than the entire fuel-cell stack 10. For example, compressive members 16 may engage two adjacent plates 12 to apply a compressive force to the two plates 12 or may engage a number of adjacent plates 12 to apply a compressive force to the number of adjacent plates 12.

Figure 2:
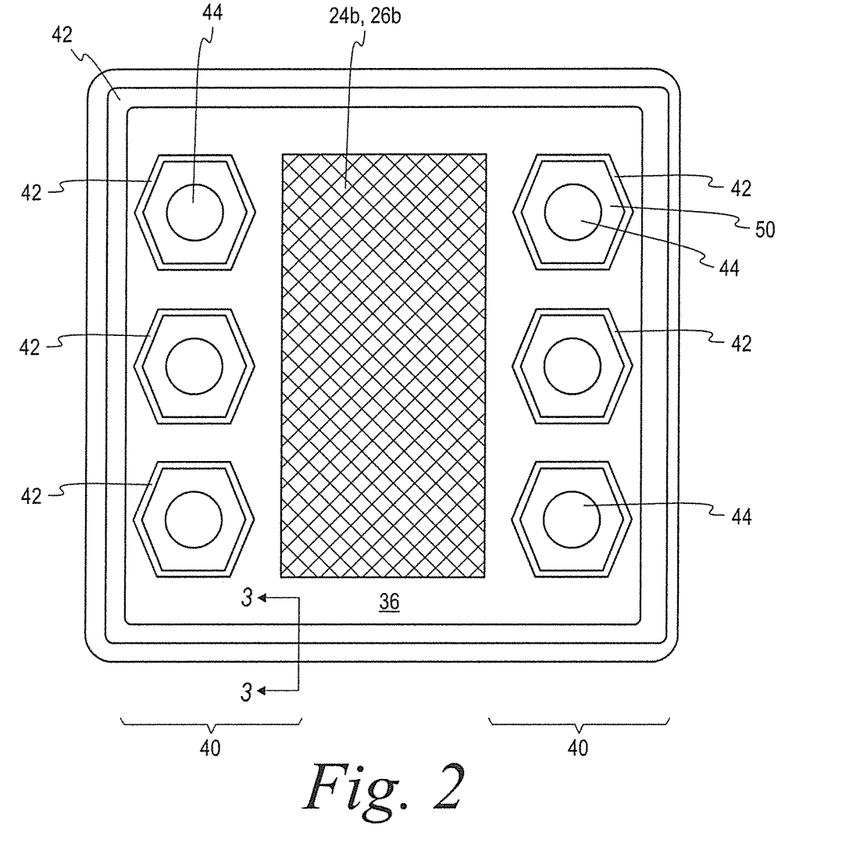
FIG. 2 is a schematic plan view of a monopolar plate of the fuel-cell stack of FIG. 1 according to aspects of the present disclosure.

FIG. 2 is a plan view of an example monopolar plate 20 of the fuel-cell stack 10. The monopolar plate 20 is a generally planar sheet having a working face 36, a rear face 38 opposite the working face, header portions 40, and beads 42. The illustrated monopolar plate 20 is a metal sheet defining structures thereon. The structures are formed by stamping the metal sheet. It is contemplated that other materials such as carbon fiber and other methods of formation such as molding and additive manufacturing may be used to form the monopolar plate 20.

Reactant channels 24b, 26b are defined on the working face 36 of the monopolar plate 20. The reactant channels 24b, 26b of a particular monopolar plate 20 are either fuel channels 24b or oxidant channels 26b. The reactant channels 24b, 26b distribute fluid flowing therethrough over the face of an adjacent unified electrode assembly 14 or fuel cell 30. For example, the fuel channels 24b distribute hydrogen to the anode of the fuel cell 30 and the oxidant channels 26b distribute oxygen to the cathode of the fuel cell 30.

The header portion 40 is disposed in a peripheral area of the monopolar plate 20 and defines a plurality of apertures 44 extending through the monopolar plate 20. The apertures 44 allow fluid to flow from one side of the monopolar plate 20 to the other side of the monopolar plate 20.

The beads 42 extend from the working face 36 of the monopolar plate 20. At least one bead 42 is disposed along a periphery of the working face 36 of the monopolar plate 20 to inhibit leakage of fluid from, for example, the reactant channels 24b, 26b to outside of the monopolar plate 20 (e.g., leaking to the environment or to the fuel-cell stack 10). Additional beads 42 are disposed adjacent to and surrounding each aperture 44. The beads 42 surrounding each aperture inhibit leakage of fluid from the aperture to the fluid channels 24b, 26b, 28b of the monopolar plate 20. For example, the bead 42 surrounding an aperture 44 with coolant flowing therethrough inhibits the coolant from leaking into the reactant channels 24b, 26b of the monopolar plate 20 and mixing with the reactant flowing therethrough. It is contemplated that a bead 42 may surround more than one aperture 44.

Optionally, coolant channels 28b may be defined on the rear face 38 of the monopolar plate 20. The coolant channels 28b distribute coolant flowing therethrough over the rear face 38 of the monopolar plate 20 to remove heat generated during the chemical reaction. Additionally, the coolant channels 28b can be used to deliver heat to the fuel cells 30 to facilitate the chemical reaction, for example, in cold operating conditions. It is contemplated that beads 42 and other features may extend from the rear face 38 of the monopolar plate 20.

Figure 3:
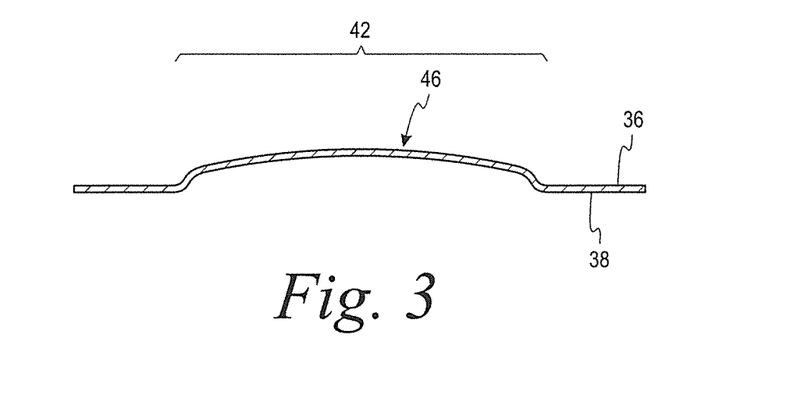
FIG. 3 is a cross-sectional schematic illustration of the plate of FIG. 2.

FIG. 3 is a cross-sectional illustration of the bead 42 of the monopolar plate 20 taken along line 3-3. The bead 42 defines a generally arcuate shape. The bead 42 defines a sealing surface 46 on the working face 36. The sealing surface 46 is configured to contact a component adjacent to the working face 36 of the monopolar plate 20. The sealing surface 46 will form a fluid-tight seal with the adjacent component when the contact pressure at all points on the bead 42 exceeds a certain threshold.

The beads 42 form a resilient structure that deflects when pressure is applied. The deflection increases the portion of the sealing surface 46 in contact with the adjacent component. While the illustrated bead 42 is generally arcuate in cross-section, it is contemplated that other shapes can be used. In some non-limiting examples, the cross-sectional profile of the bead 42 is generally rectangular, generally trapezoidal, generally linear sidewalls with an arcuate portion spanning therebetween, combinations thereof, or the like, Further, while the illustrated bead 42 is generally symmetrical, it is contemplated that asymmetrical beads 42 can be used.

Figure 4:
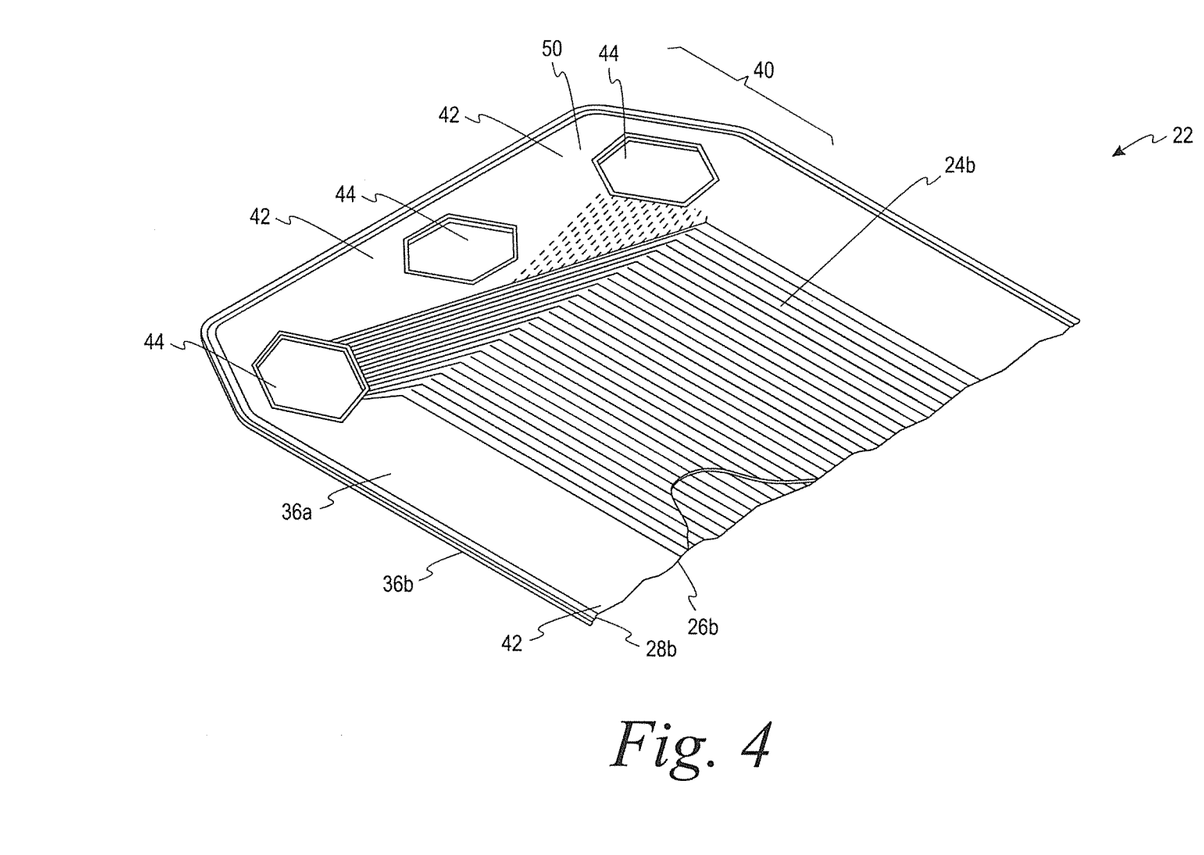
FIG. 4 is a schematic isometric view of a bipolar plate, shown in partial cross-section, according to aspects of the present disclosure.

FIG. 4 is an isometric view of the bipolar plate 22 in partial cross-section. Bipolar plates 22 can be formed in various ways. For example, the rear faces 38 of two monopolar plates 20 can be placed together and the monopolar plates 20 bonded to form the bipolar plate 22. The bond can be formed by, for example, welding or use of an adhesive.

The bipolar plate 22 includes a first working face 36a opposite a second working face 36b. Each working face 36 defines reactant channels 24b, 26b thereon. For example, the first working face 36a defines the fuel channels 24b while the second working face 36b defines the oxidant channels 26b. Placing the rear faces 38 of the two monopolar plates 20 together results in coolant channels 28b being defined by space between the two monopolar plates 20 as is illustrated in FIG. 4.

Bipolar plates 22 can be also be formed using a variety of methods such as 3D-printing. In some aspects, the bipolar plate 22 is formed by stamping reactant channels 24b, 26b onto opposite faces of a single sheet without the presence of cooling channels 28b therebetween.

When the fuel-cell stack 10 is assembled, the apertures 44 in the header portions 40 of each plate 12 are substantially aligned with respective apertures 44 of adjacent plates 12 or unified electrode assemblies 14 to form a plurality of inlet manifolds (not shown) and a plurality of outlet manifolds (not shown). The beads 42 of each component are compressed against beads 42 of adjacent components such that fluid-tight seals are formed to define a plurality of fluid flowpaths 24, 26, 28. The fuel flowpath 24 is defined by the fuel inlet 24a, a fuel inlet manifold (not shown), fuel channels 24b of respective plates 12, a fuel outlet manifold (not shown), and fuel outlet 24c. Similarly, an oxidant flowpath 26 is defined by the oxidant inlet 26a, an oxidant inlet manifold (not shown), the oxidant channels 26b, and oxidant outlet manifold (not shown), and the oxidant outlet 26c. The coolant flowpath 28 includes the coolant inlet 28a, a coolant inlet manifold (not shown), the coolant channels 28b, a coolant outlet manifold (not shown), and a coolant outlet 28c.

When in operation, at least two fluids flow through the fuel-cell stack 10 in separate fluid flowpaths 24, 26, 28. In some example fuel-cell stacks 10, the fluids enter the fluid inlets 24a, 26a, 28a, flow through a respective manifold along a peripheral side of the fuel-cell stack 10, traverse the components in a lateral direction via the fluid channels 24b, 26b, 28b, flow through a respective manifold on an opposite peripheral side of the fuel-cell stack 10, and exit the fuel-cell stack 10 via the fluid outlets 24c, 26c, 28c. In some examples, at least two of the fluids flow in a counter-current configuration.

A substantially fluid-tight seal is formed between fuel-cell stack 10 components to inhibit undesirable mixing of the fluids flowing through the fuel-cell stack 10. These substantially fluid-tight seals are formed by applying contact pressure to the sealing surfaces 46. It is believed that differences in contact pressure along the sealing surfaces 46 of the beads 42 contribute to leaks. It is also believed that evenly distributing the contact pressure along the sealing surfaces 46 of the beads 42 can beneficially affect properties of the fuel-cell stack 10. For example, systems, components, and methods consonant with the present disclosure can increase seal effectiveness by evenly distributing the contact pressure across the header portions 40 of the plates 12. Further, systems, components, and methods consonant with the present disclosure can also reduce cost of manufacturing components by reducing the amount of compressive force required to maintain adequate contact pressure through the stack. Yet further, systems, components, and methods consonant with the present disclosure can also positively affect longevity of the fuel-cell stack by reducing the maximum contact pressure applied to the components.

The contact pressure applied to the sealing surfaces 46 results from the compressive force applied to the fuel-cell stack 10 and should be maintained above a threshold level to maintain the substantially fluid-tight seals. Because the fuel-cell stack 10 can include a substantial number of components, even minor variations in distribution of the contact pressure along the beads 42 can be greatly amplified when the components are assembled in the fuel-cell stack 10.

Beneficially, contact pressure distribution along the sealing surface 46 of a bead 42 can be evenly distributed by employing generally regular shapes into the header portions 40. It is believed that employing regular shapes yields evenly distributed contact pressure along the sealing surface 46 by providing geometric features (e.g., corner angles) that are generally uniform throughout the header portion 40.

Figure 5:
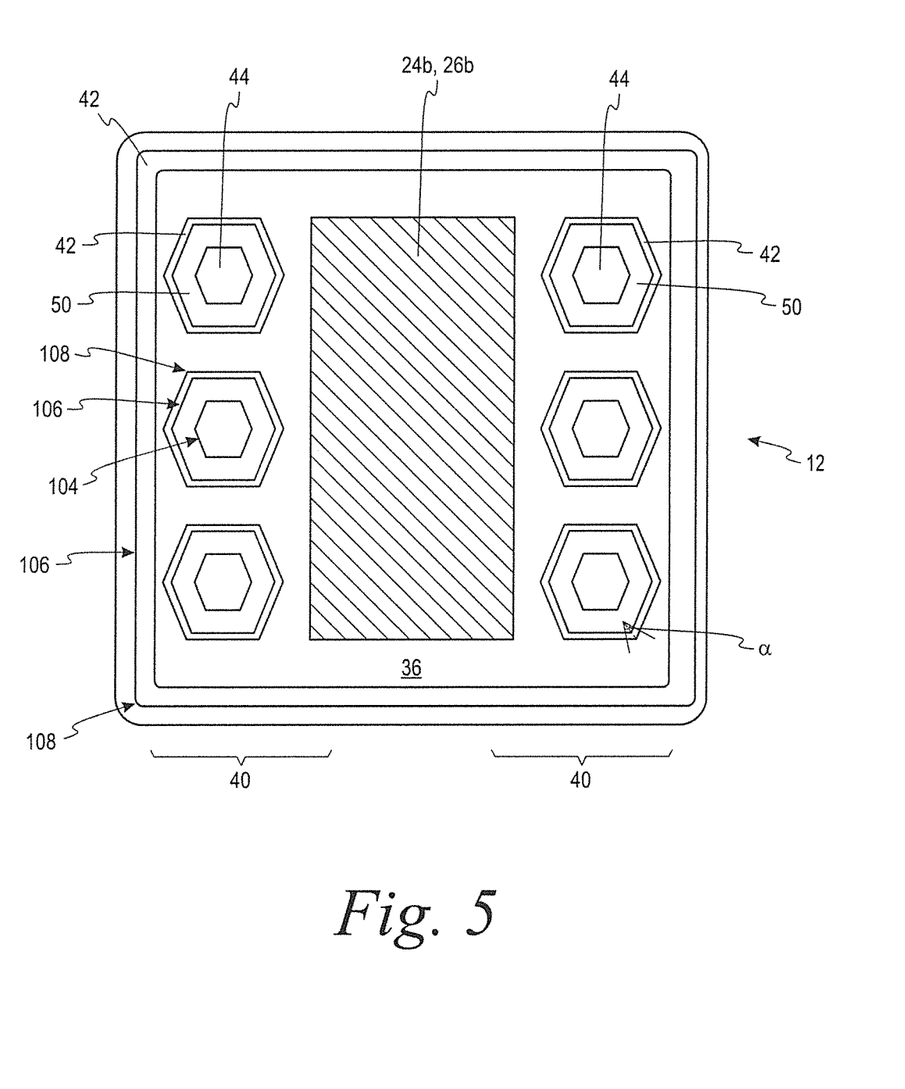
FIG. 5 is a schematic plan view of an example header portion employing generally regular shapes according to aspects of the present disclosure.

FIG. 5 is a schematic plan view of a plate 12 having a header portion 40a employing generally regular shapes. The plate 12 includes a working face 36 a plurality of reactant channels 24b, 26b, header portions 40a, and a bead 42 generally disposed about the periphery of the plate 12.

The header portions 40a are disposed at ends of the plate 12. The header portions 40a include a plurality of beads 42 and a plurality of flanges 50 defining a plurality of apertures 44 through the plate 12. Each flange 50 is defined between a bead 42 and respective aperture 44 with a flange edge 104 defining the aperture 44 though the plate. Each of the apertures 44 is configured to allow a fluid to flow therethrough, and at least one of the apertures 44 in each header portion 40a is fluidly connected to the plurality of reactant channels 24b, 26b. When in use, fluids flow through each of the apertures 44 such that a reactant flowing through the connected aperture 44 or connected apertures 44 at one end of the plate 12 may enter the reactant channels 24b, 26b, traverse the flow field defined by the reactant channels 24b, 26b and exit the plate through the connected aperture 44 or connected apertures 44 on the opposite end of the plate 12. The bead 42 disposed about the periphery of the plate 12 can also be referred to as an outer bead 42 while beads 42 disposed about the flanges 50 can be referred to as inner beads 42.

The beads 42 are configured to provide a substantially fluid-tight seal between the plate 12 and adjacent components of the fuel-cell stack 10. Each inner bead 42 is disposed about a respective one of the apertures 44 to define the respective flange 50.

Each of the beads 42 defines a respective shape. The shape can be, for example, a polygon consisting of bead-sides 106 and bead-corners 108. The polygon can have any number of bead-sides 106 and bead-corners 108 such as, for example, being generally hexagonal as illustrated by the regular hexagons of FIG. 5. The bead-corners 108 define an angle $\alpha$. The angle $\alpha$ is defined by a first line extending perpendicular to a first of the bead-sides 106 and a second line extending perpendicular to a second of the bead-sides 106. The first line begins at a transition between the bead-corner 108 and the first of the bead-sides 106, and the second line begins at a transition between the bead-corner 108 and the second of the bead-sides 106. In some aspects, each bead-corner defines an angle $\alpha$ measuring between about 50° and about 70°. In some aspects, each bead-corner defines an angle $\alpha$ measuring about 60°. While the illustrated polygon is generally hexagonal, it is contemplated that other polygonal shapes may be used. In some aspects, the shape includes more than six bead-corners 108, and each bead-corner 108 measures an angle $\alpha$ within about 10° of every other angle $\alpha$.

It is contemplated that the header portion 40 may incorporate any number of flanges 50. For example, a plate 12 configured for operation with two reactants and a coolant may include one flange 50 for the coolant, one flange 50 for the first reactant, and one flange 50 for the second reactant. Alternatively, another plate 12 configured for operation with two reactants and a coolant may include one flange 50 for the coolant, two flanges 50 for the first reactant, and one flange 50 for the second reactant.

In some aspects, the bead-side 106 is generally linear and the bead-corner 108 is generally radiused. While the bead-corner 108 is generally radiused, one of ordinary skill in the art will readily recognize that the radiused bead-corner 108 would still define an angle. In some aspects, the bead-sides 106 include reinforcement structures or "wiggles" that follow a generally serpentine path. These reinforcement structures are configured to inhibit emergence of weak points along straight runs of the bead 42 by inhibiting excessive deformation of the bead 42 when the plate 12 is compressed in the fuel-cell stack 10. The bead-side 106 is generally linear through the serpentine path. Notably, the "wiggles" along the serpentine path share a particular radius with first portions being radiused inward toward the flange 50 and second portions, interposed between the first portions, being radiused outward from the flange 50.

Figure 6:
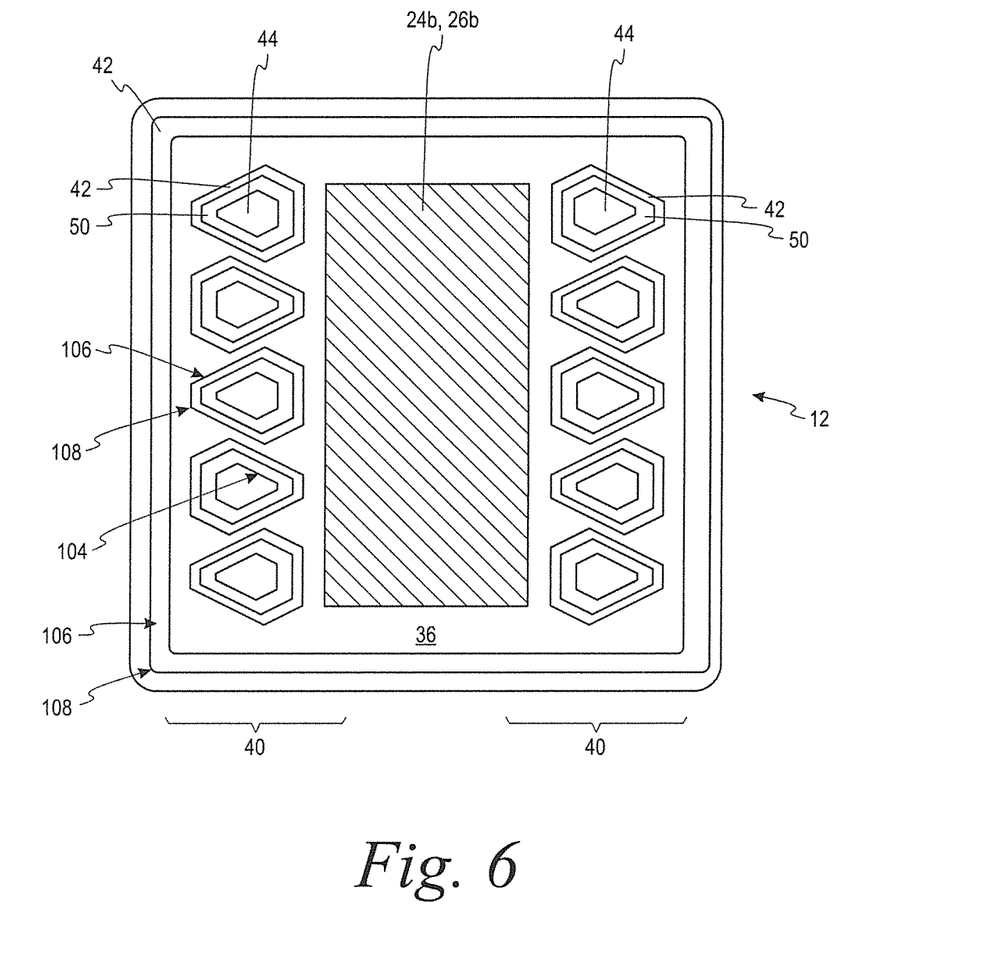
FIG. 6 is a schematic plan view of another example header portion employing generally regular shapes according to aspects of the present disclosure.

FIG. 6 is a schematic plan view of a plate 12 having a header portion 40b employing generally regular shapes. Similar to FIG. 5, the plate 12 includes a working face 36 a plurality of reactant channels 24b, 26b, header portions 40b, and a bead 42 generally disposed about the periphery of the plate 12.

Similarly to FIG. 5, the header portions 40b illustrated in FIG. 6 are disposed at ends of the plate 12, and each of the beads 42 defines a respective shape such as a polygon consisting of bead-sides 106 and bead-corners 108. The polygons illustrated in FIG. 6 are irregular hexagons. These irregular polygons can provide for closer grouping of the flanges 50 such as the five flanges 50 illustrated in FIG. 6 occupying the same general space as the three illustrated flanges 50 in FIG. 5. Additionally, the flanges 50 can be staggered to provide for closer grouping of the flanges 50.

Surprisingly, header portions 40 employing regular shapes balance contact pressures exerted on all beads 42 of the header portion 40 including the inner beads 42 about the flange 50 and the outer beads 42 adjacent the inner beads 42. In some aspects, the regular shapes include corner angles of about 60° to balance contact pressures exerted corners having various radiuses.

Various bead configurations can be modeled to compare various header portions 40 configurations such as comparing header portions 40 having numerous bead-corner angles, numerous bead-corner radii, and numerous features between the bead 42 and aperture 44 to compare and optimize spring constants for various configurations. It is believed that the spring constant generally decreases as the bead-corner angle decreases. For example, the spring constant for a bead 42 having a bead-corner angle of 60° will be generally lower than the spring constant for the bead 42 having a bead-corner angle of 120°. It is further believed that the spring constant generally decreases as the bead-corner radius increases. For example, the spring constant for a bead 42 having a bead-corner radius of 15 mm will be generally lower than the bead 42 having a bead-corner radius of 6 mm. It is additionally believed that the spring constant for a bead 42 having features (such as additional beads 42) between the bead 42 and the aperture 44 is generally lower than the spring constant for the bead 42 having no features between the bead 42 and the aperture 44. For example, the spring constant for an outer, double bead 42 (i.e., the outermost bead 42 of two beads 42 proximate the modeled flange 50) will be generally lower than the spring constant for a single bead having a similar bead-corner radius and bead-corner angle.

According to a non-limiting example, modeling the spring constant of a single, inner bead 42 having a radius of 6 mm produces a spring constant of about 200 N/mm$^2$ when the bead angle is about 120° and a spring constant of about 135 N/mm$^2$ when the bead angle is about 60°. According to a non-limiting example, modeling the spring constant of a double, outer bead 42 having a radius of 6 mm produces a spring constant of about 180 N/mm$^2$ when the bead angle is about 120° and a spring constant of about 95 N/mm$^2$ when the bead angle is about 60°. According to a non-limiting example, modeling the spring constant of a single, inner bead 42 having a radius of 10 mm produces a spring constant of about 120 N/mm$^2$ when the bead angle is about 120° and a spring constant of about 90 N/mm$^2$ when the bead angle is about 60°. According to a non-limiting example, modeling the spring constant of a double, outer bead 42 having a radius of 10 mm produces a spring constant of about 160 N/mm$^2$ when the bead angle is about 120° and a spring constant of about 90 N/mm$^2$ when the bead angle is about 60°. According to a non-limiting example, modeling the spring constant of a single, inner bead 42 having a radius of 15 mm produces a spring constant of about 90 N/mm$^2$ when the bead angle is about 120° and a spring constant of about 80 N/mm$^2$ when the bead angle is about 60°. According to a non-limiting example, modeling the spring constant of a double, outer bead 42 having a radius of 15 mm produces a spring constant of about 130 N/mm$^2$ when the bead angle is about 120° and a spring constant of about 90 N/mm$^2$ when the bead angle is about 60°.

As can be seen, the modeled examples indicate that the spring constants for beads 42 of various radii and bead types begin to converge as the bead-corner angles approach 60° from greater bead-corner angles. In particular, the variation of spring constants for beads 42 of various radii and configurations at 60° is much narrower than the variation of spring constants for the beads 42 at 120°. For example, the spring constants for the beads 42 modeled and described above vary between about 200 N/mm$^2$ and about 90 N/mm$^2$ at 120°, whereas the spring constants for the beads 42 modeled and described above between about 135 N/mm$^2$ and about 80 N/mm$^2$ at 60°. Notably, the spring constants for a subset of the beads 42 modeled and described above, namely a single bead having a radius of 6 mm, a double bead having a radius of 6 mm, a double bead having a radius of 10 mm, and a double bead having a radius of 15 mm, is within about 10 N/mm$^2$. This generally narrow range of spring constants contributes to an contact pressure distribution along the sealing surfaces 46 of the beads 42. Beneficially, flanges 50 with beads 42 having bead-corners between 50° and 70° allows for more tunnels to be formed connecting the flange 50 to the reactant channels 24b, 26b than flanges with beads having generally curved boundaries.

As can also be seen, the trend lines have different slopes and, thus, the spread of spring constants may not be able to become lower than some non-zero minimum value as the lines will begin to trend away from each other. Moreover, as the angles of the bead-corners narrow, design constraints such as the perimeter distance for the tunnels that feed the reactant channels 24b, 26b from the respective flanges 50 as well as positioning of the flanges 50 become less favorable than bead-corners of larger angles, such as angles between 50° and 70°.

Figure 7:
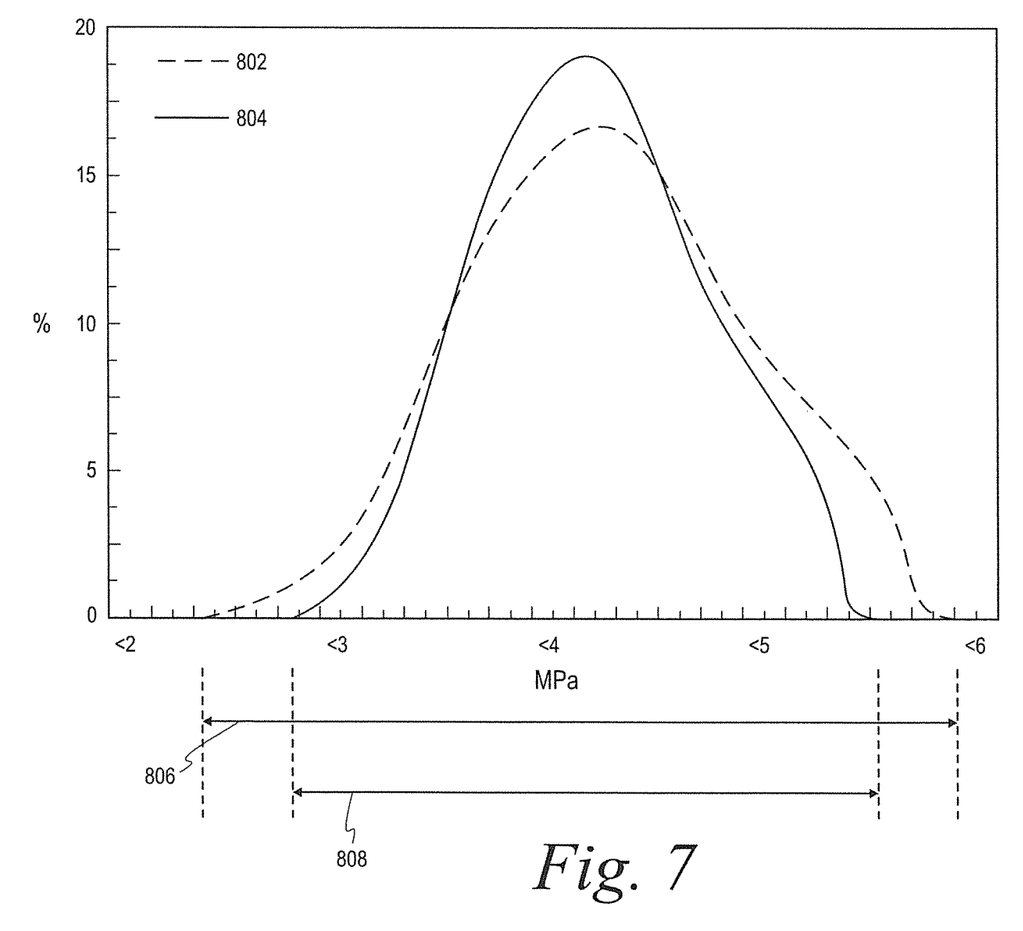
FIG. 7 is a graph comparing contact pressure probability distributions for header portions employing generally regular shapes and header portions employing non-regular shapes.

FIG. 7 is a graph comparing contact pressure probability distributions for header portions employing non-regular shapes illustrated by line 802 and header portions employing generally regular shapes illustrated by line 804. The bins of contact pressure are given in MPa and the percentage of beads occupying each bin is illustrated by the height of the respective bar. Line 806 represents the contact pressure distribution of headers employing non-regular shapes while line 808 represents the contact pressure distribution of headers employing regular shapes. As can be seen, the contact pressure distribution 808 of headers employing regular shapes is significantly narrower than the contact pressure distribution 806 of headers employing non-regular shapes. As can be also seen, the probability of points along the sealing surface 46 being exposed to contact pressures away from the median (e.g., those below 2.8 MPa" and those above 5.2 MPa) is significantly lowered. This narrowed distribution and lowered probability provides for fewer leaks along sealing surfaces 46 at a given compressive force for the fuel-cell stack 10 because fewer portions of the beads 42 will be exposed to a contact pressure below the sealing threshold.

In some aspects, bead-corners are configured to produce a contact pressure variance of less than about 50% along the sealing surface. In some aspects, the bead-corners are configured to produce a contact pressure variance of less than about 30% along the sealing surface. In some aspects, the bead-corners are configured to produce a contact pressure variance of less than about 15% along the sealing surface.

It is contemplated that the bead 42 generally disposed about the periphery of the plate (also referred to as the outer bead) may define a path that interposes the outer bead between the beads 42 of the plurality of flanges 50 in the header portion 40. For example, the outer bead can encircle portions of the flanges 50 in an serpentine manner such that the outer bead is disposed in a space between a first flange 50 and an outer edge of the plate 12, a space between the first flange 50 and a second flange 50, a space between the second flange and the reactant channels 24b, 26b, a space between the second flange 50 and a third flange 50, a space between the third flange 50 and the outer edge of the plate 12. It is contemplated that this serpentine path can also be configured to contribute to evenly distributing contact pressure along sealing surfaces 46 of the beads.

While the best modes for carrying out the disclosure have been described in detail, those familiar with the art to which this disclosure relates will recognize various alternative designs and embodiments for practicing the disclosure within the scope of the appended claims.

What is claimed is:

1. A plate comprising:
  a working face defining a plurality of reactant channels thereon;
  a header portion disposed in a peripheral area of the plate, the header portion including:
    a plurality of flanges disposed thereon,
      the plurality of flanges defining a plurality of apertures through the plate,
      each of the plurality of flanges defining a respective one of the plurality of apertures,
      at least one of the plurality of apertures being fluidly connected to the plurality of reactant channels; and
    a plurality of beads disposed on the working face,
      each of the plurality of beads disposed about a respective one of the plurality of apertures thereby defining a respective one of the plurality of flanges,
      each of the plurality of beads defining a regular shape consisting of bead-corners and bead-sides, wherein the regular shape is generally hexagonal and each bead-corner defines an angle measuring 60° between a first line extending perpendicular to a first of the bead-sides and a second line extending perpendicular to a second of the bead-sides,
      each of the plurality of beads having a sealing surface thereon, the sealing surface configured to deflect when exposed to a contact pressure to thereby provide a substantially fluid-tight seal.

2. The plate of claim 1, wherein the bead-corners are configured to produce a contact pressure variance of less than about 50% along the sealing surface.

3. The plate of claim 1, wherein the bead-corners are configured to produce a contact pressure variance of less than about 30% along the sealing surface.

4. The plate of claim 1, wherein each of the bead-corners is generally radiused.

5. The plate of claim 1, wherein each of the bead-sides follows a serpentine path.

6. A system comprising:
  a plate including:
    a working face defining a plurality of reactant channels thereon; and
    a header portion disposed in a peripheral area of the plate, the header portion including:
      a plurality of flanges disposed thereon, the plurality of flanges defining a plurality of first apertures through the plate, each of the plurality of flanges defining a respective one of the plurality of first apertures, at least one of the plurality of first apertures being fluidly connected to the plurality of reactant channels; and
      a plurality of beads disposed on the working face, each of the plurality of beads disposed about a respective one of the plurality of first apertures thereby defining a respective one of the plurality of flanges, each of the plurality of beads defining a regular shape consisting of bead-corners and bead-sides, wherein the regular shape is generally hexagonal and each bead-corner defines an angle measuring 60° between a first line extending perpendicular to a first of the bead-sides and a second line extending perpendicular to a second of the bead-sides, each of the plurality of beads having a sealing surface thereon, the sealing surface configured to deflect when exposed to a contact pressure to thereby provide a substantially fluid-tight seal;
  a component abutting the plate, the component including a plurality of second apertures therethrough, each of the plurality of second apertures being aligned with a respective one of the plurality of first apertures; and
  a compressive member configured to exert a compressive force on the plate to thereby produce the contact pressure.

7. The system of claim 6, wherein the component further includes:
  a second working face having a plurality of second beads disposed thereon, each of the plurality of second beads disposed about a respective one of the plurality of second apertures, each of the plurality of second beads defining the regular shape.

8. The system of claim 7, wherein the second working face is disposed proximate the working face;
  wherein each of the plurality of second beads includes a second sealing surface thereon; and
  wherein the component abuts the plate when the second sealing surface contacts the sealing surface to produce the contact pressure therebetween.

9. The system of claim 6, wherein the plate further includes a first rear face opposite the working face;
  wherein the component further includes a second rear face, the second rear face being attached to the first rear face; and
  wherein the first rear face and the second rear face define a plurality of coolant channels between the plate and the component, the plurality of coolant channels being fluidly connected to at least another of the plurality of first apertures.

10. The system of claim 6, wherein the bead-corners are configured to produce a contact pressure variance of less than about 30% along the sealing surface.

11. The system of claim 6, wherein the component is a unified electrode assembly.

12. A fuel-cell stack comprising:
a first plate including:
  a first working face defining a plurality of first reactant channels thereon; and
  a first header portion disposed in a peripheral area of the first plate, the first header portion including:
    a plurality of first flanges disposed thereon, the plurality of first flanges defining a plurality of first apertures through the first plate, each of the plurality of first flanges defining a respective one of the plurality of first apertures, at least one of the plurality of first apertures being fluidly connected to the plurality of first reactant channels; and
    a plurality of first beads disposed on the first working face, each of the plurality of first beads disposed about a respective one of the plurality of first apertures thereby defining a respective one of the plurality of first flanges, each of the plurality of first beads defining a regular shape consisting of bead-corners and bead-sides, wherein the regular shape is generally hexagonal and each bead-corner defines an angle measuring 60° between a first line extending perpendicular to a first of the bead-sides and a second line extending perpendicular to a second of the bead-sides, each of the plurality of first beads having a first sealing surface thereon, the first sealing surface configured to deflect when exposed to a contact pressure to thereby provide a substantially fluid-tight seal;
a second plate including:
  a second working face defining a plurality of second reactant channels thereon; and
  a second header portion disposed in a peripheral area of the second plate, the second header portion including:
    a plurality of second flanges disposed thereon, the plurality of second flanges defining a plurality of second apertures through the second plate, each of the plurality of second flanges defining a respective one of the plurality of second apertures, at least one of the plurality of second apertures being fluidly connected to the plurality of second reactant channels; and
    a plurality of second beads disposed on the second working face, each of the plurality of second beads disposed about a respective one of the plurality of second apertures thereby defining a respective one of the plurality of second flanges, each of the plurality of second beads defining the regular shape consisting of second bead-corners and second bead-sides, wherein each of the second bead-corners defines a second angle measuring 60° between a first line extending perpendicular to a first of the second bead-sides and a second line extending perpendicular to a second of the second bead-sides, each of the plurality of second beads having a second sealing surface thereon, the second sealing surface configured to deflect when exposed to the contact pressure to thereby provide a substantially fluid-tight seal;
a unified electrode assembly disposed between the first plate and the second plate, the unified electrode assembly including a first side contacting the plurality of first reactant channels and a second side contacting the plurality of second reactant channels; and
a compressive member configured to exert a compressive force on the first plate, the second plate, and the unified electrode assembly, the compressive force configured to apply the contact pressure to the plurality of first beads and the plurality of second beads.

* * * * *